(12) United States Patent
Lu

(10) Patent No.: US 7,769,261 B2
(45) Date of Patent: Aug. 3, 2010

(54) FIBER OPTIC DISTRIBUTION CABLE

(75) Inventor: Yu Lu, Eden Prairie, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/850,354

(22) Filed: Sep. 5, 2007

(65) Prior Publication Data
US 2009/0060431 A1    Mar. 5, 2009

(51) Int. Cl.
G02B 6/44    (2006.01)
G02B 6/00    (2006.01)

(52) U.S. Cl. ...................... 385/100; 385/134
(58) Field of Classification Search .............. 385/100
See application file for complete search history.

(56) References Cited

U.S. PATENT DOCUMENTS

| | | | |
|---|---|---|---|
| 2,047,152 A | 7/1936 | Mitchell | |
| 3,691,505 A | 9/1972 | Graves | |
| 3,845,552 A | 11/1974 | Waltz | |
| 3,879,575 A | 4/1975 | Dobbin et al. | |
| 3,912,854 A | 10/1975 | Thompson et al. | |
| 3,912,855 A | 10/1975 | Thompson et al. | |
| 4,085,286 A | 4/1978 | Horsma et al. | |
| 4,107,451 A | 8/1978 | Smith, Jr. et al. | |
| 4,152,539 A | 5/1979 | Charlebois et al. | |
| 4,322,573 A | 3/1982 | Charlebois | |
| 4,343,844 A | 8/1982 | Thayer et al. | |
| 4,405,083 A | 9/1983 | Charlebois et al. | |
| 4,413,881 A | 11/1983 | Kovats | |
| 4,467,137 A | 8/1984 | Paget et al. | |
| 4,475,935 A | 10/1984 | Tanaka et al. | |
| 4,481,380 A | 11/1984 | Wood et al. | |
| 4,490,315 A | 12/1984 | Charlebois et al. | |
| 4,512,628 A | 4/1985 | Anderton | |
| 4,528,150 A | 7/1985 | Charlebois et al. | |
| 4,528,419 A | 7/1985 | Charlebois et al. | |
| 4,549,039 A | 10/1985 | Charlebois et al. | |
| 4,550,220 A | 10/1985 | Kitchens | |
| 4,556,281 A | 12/1985 | Anderton | |
| 4,570,032 A | 2/1986 | Charlebois et al. | |
| 4,581,480 A | 4/1986 | Charlebois | |

(Continued)

FOREIGN PATENT DOCUMENTS

DE    31 08 381 A1    9/1982

(Continued)

OTHER PUBLICATIONS

"Cable Assemblies: Molding & Termination," http://www.dgo.com/prodcable.htm, 8 pages (Copyright 2001).

(Continued)

*Primary Examiner*—Uyen-Chau N Le
*Assistant Examiner*—Chris H Chu
(74) *Attorney, Agent, or Firm*—Merchant & Gould P.C.

(57) ABSTRACT

A fiber optic distribution cable including a main cable having a plurality of branch locations. Branch cables divert from the main cable at the branch locations. The branch cables are secured to branch anchors located at the branch locations. Optical fibers are routed through the branch anchors from the main cable to the branch cables. Protective enclosures cover the branch locations.

11 Claims, 8 Drawing Sheets

U.S. PATENT DOCUMENTS

| | | |
|---|---|---|
| 4,589,939 A | 5/1986 | Mohebban et al. |
| 4,591,330 A | 5/1986 | Charlebois et al. |
| 4,592,721 A | 6/1986 | Charlebois et al. |
| 4,595,256 A | 6/1986 | Guazzo |
| 4,609,773 A | 9/1986 | Brown et al. |
| 4,625,073 A | 11/1986 | Breesch et al. |
| 4,629,597 A | 12/1986 | Charlebois et al. |
| 4,648,606 A | 3/1987 | Brown et al. |
| 4,648,919 A | 3/1987 | Diaz et al. |
| 4,654,474 A | 3/1987 | Charlebois et al. |
| 4,666,537 A | 5/1987 | Dienes |
| 4,670,069 A | 6/1987 | Debbaut et al. |
| 4,670,980 A | 6/1987 | Charlebois et al. |
| 4,678,866 A | 7/1987 | Charlebois |
| 4,684,764 A | 8/1987 | Luzzi et al. |
| 4,701,574 A | 10/1987 | Shimirak et al. |
| 4,725,035 A | 2/1988 | Charlebois et al. |
| 4,732,628 A | 3/1988 | Dienes |
| 4,747,020 A | 5/1988 | Brickley et al. |
| 4,759,602 A | 7/1988 | Pascher |
| 4,761,052 A | 8/1988 | Buekers et al. |
| 4,764,232 A | 8/1988 | Hunter |
| 4,818,824 A | 4/1989 | Dixit et al. |
| 4,822,134 A | 4/1989 | Campbell |
| 4,822,434 A | 4/1989 | Sawaki et al. |
| 4,875,952 A | 10/1989 | Mullin et al. |
| 4,884,863 A | 12/1989 | Throckmorton |
| 4,913,512 A | 4/1990 | Anderton |
| 4,961,623 A | 10/1990 | Midkiff et al. |
| 4,963,698 A | 10/1990 | Chang et al. |
| 4,983,013 A | 1/1991 | Dotzer et al. |
| 4,983,333 A | 1/1991 | Blew |
| 4,985,185 A | 1/1991 | Mayr et al. |
| 5,004,315 A | 4/1991 | Miyazaki |
| 5,042,901 A | 8/1991 | Merriken et al. |
| 5,046,811 A | 9/1991 | Jung et al. |
| 5,054,868 A | 10/1991 | Hoban et al. |
| 5,066,095 A | 11/1991 | Dekeyser et al. |
| 5,074,808 A | 12/1991 | Beamenderfer et al. |
| 5,097,529 A | 3/1992 | Cobb et al. |
| 5,099,088 A | 3/1992 | Usami et al. |
| 5,115,105 A | 5/1992 | Gallusser et al. |
| 5,121,458 A | 6/1992 | Nilsson et al. |
| 5,125,060 A * | 6/1992 | Edmundson ............... 385/100 |
| 5,163,116 A | 11/1992 | Oestreich et al. |
| 5,185,844 A | 2/1993 | Bensel, III et al. |
| 5,194,692 A | 3/1993 | Gallusser et al. |
| 5,210,812 A * | 5/1993 | Nilsson et al. .............. 385/100 |
| 5,217,808 A | 6/1993 | Cobb |
| 5,241,611 A | 8/1993 | Gould |
| 5,245,151 A | 9/1993 | Chamberlain et al. |
| 5,283,014 A | 2/1994 | Oestreich et al. |
| 5,335,408 A | 8/1994 | Cobb |
| 5,347,089 A | 9/1994 | Barrat et al. |
| 5,353,367 A | 10/1994 | Czosnowski et al. |
| 5,371,824 A | 12/1994 | Parris et al. |
| 5,376,196 A | 12/1994 | Grajewski et al. |
| 5,378,853 A | 1/1995 | Clouet et al. |
| 5,394,502 A | 2/1995 | Caron |
| 5,402,515 A | 3/1995 | Vidacovich et al. |
| 5,410,105 A | 4/1995 | Tahara et al. |
| RE34,955 E | 5/1995 | Anton et al. |
| 5,420,958 A | 5/1995 | Henson et al. |
| 5,440,665 A | 8/1995 | Ray et al. |
| 5,442,726 A | 8/1995 | Howard et al. |
| 5,450,517 A | 9/1995 | Essert |
| 5,491,766 A | 2/1996 | Huynh et al. |
| 5,509,202 A | 4/1996 | Abdow |
| 5,517,592 A | 5/1996 | Grajewski et al. |
| 5,528,718 A | 6/1996 | Ray et al. |
| 5,608,832 A | 3/1997 | Pfandl et al. |
| 5,657,413 A | 8/1997 | Ray et al. |
| 5,666,453 A | 9/1997 | Dannenmann |
| 5,684,911 A | 11/1997 | Burgett |
| 5,696,864 A | 12/1997 | Smith et al. |
| 5,734,776 A | 3/1998 | Puetz |
| 5,761,361 A | 6/1998 | Pfandl et al. |
| 5,767,448 A | 6/1998 | Dong |
| 5,778,122 A | 7/1998 | Giebel et al. |
| 5,815,908 A | 10/1998 | Wichmann |
| 5,823,646 A | 10/1998 | Arizpe et al. |
| 5,825,963 A | 10/1998 | Burgett |
| 5,892,870 A | 4/1999 | Fingler et al. |
| 5,945,633 A | 8/1999 | Ott et al. |
| 5,969,294 A | 10/1999 | Eberle et al. |
| 5,997,186 A | 12/1999 | Huynh et al. |
| RE36,592 E | 2/2000 | Giebel et al. |
| 6,035,090 A | 3/2000 | Kawaguchi et al. |
| 6,104,846 A | 8/2000 | Hodgson et al. |
| RE37,028 E | 1/2001 | Cooke et al. |
| 6,181,861 B1 | 1/2001 | Wenski et al. |
| 6,215,930 B1 | 4/2001 | Estes et al. |
| 6,255,584 B1 | 7/2001 | Renaud |
| 6,278,831 B1 * | 8/2001 | Henderson et al. .......... 385/139 |
| 6,311,000 B1 | 10/2001 | Schneider |
| 6,376,774 B1 | 4/2002 | Oh et al. |
| 6,407,338 B1 | 6/2002 | Smith |
| 6,466,725 B2 | 10/2002 | Battey et al. |
| 6,493,500 B1 | 12/2002 | Oh et al. |
| 6,539,160 B2 | 3/2003 | Battey et al. |
| 6,579,014 B2 | 6/2003 | Melton et al. |
| 6,619,697 B2 * | 9/2003 | Griffioen et al. .......... 285/126.1 |
| 6,621,975 B2 | 9/2003 | Laporte et al. |
| 6,648,520 B2 | 11/2003 | McDonald et al. |
| 6,655,016 B2 | 12/2003 | Renaud |
| 6,668,127 B1 | 12/2003 | Mahony |
| 6,706,968 B2 | 3/2004 | Yaworski et al. |
| 6,764,220 B2 | 7/2004 | Griffiths et al. |
| 6,810,194 B2 | 10/2004 | Griffiths et al. |
| 6,819,842 B1 | 11/2004 | Vogel et al. |
| 6,856,748 B1 | 2/2005 | Elkins, II et al. |
| 6,880,219 B2 | 4/2005 | Griffioen et al. |
| 7,006,739 B2 | 2/2006 | Elkins, II et al. |
| 7,016,592 B2 | 3/2006 | Elkins, II et al. |
| 7,088,893 B2 | 8/2006 | Cooke et al. |
| 7,127,143 B2 | 10/2006 | Elkins et al. |
| 7,184,633 B2 | 2/2007 | Cooke et al. |
| 7,251,411 B2 | 7/2007 | Lu et al. |
| 7,317,863 B2 | 1/2008 | Lu et al. |
| 7,422,378 B2 | 9/2008 | Lu et al. |
| 2002/0064364 A1 * | 5/2002 | Battey et al. .................. 385/136 |
| 2003/0063867 A1 | 4/2003 | McDonald et al. |
| 2004/0074852 A1 | 4/2004 | Knudsen et al. |
| 2004/0228589 A1 | 11/2004 | Melton et al. |
| 2004/0247265 A1 | 12/2004 | Takano et al. |
| 2005/0002621 A1 | 1/2005 | Zimmel et al. |
| 2005/0031276 A1 * | 2/2005 | Zimmel et al. .............. 385/100 |
| 2005/0053342 A1 | 3/2005 | Melton et al. |
| 2005/0069275 A1 | 3/2005 | Brants et al. |
| 2005/0111799 A1 | 5/2005 | Cooke et al. |
| 2005/0111800 A1 | 5/2005 | Cooke et al. |
| 2005/0129375 A1 | 6/2005 | Elkins, II et al. |
| 2005/0175308 A1 | 8/2005 | Elkins, II et al. |
| 2005/0259928 A1 | 11/2005 | Elkins, II et al. |
| 2005/0259929 A1 | 11/2005 | Elkins, II et al. |
| 2005/0259930 A1 | 11/2005 | Elkins, II et al. |
| 2005/0276551 A1 * | 12/2005 | Brown et al. ................ 385/100 |
| 2005/0276552 A1 | 12/2005 | Cooke et al. |
| 2006/0056782 A1 | 3/2006 | Elkins, II et al. |
| 2006/0115220 A1 * | 6/2006 | Elkins et al. .................. 385/87 |
| 2006/0193573 A1 | 8/2006 | Greenwood et al. |

| | | | |
|---|---|---|---|
| 2007/0009214 A1 * | 1/2007 | Elkins et al. ................ 385/100 | |

FOREIGN PATENT DOCUMENTS

| | | | |
|---|---|---|---|
| DE | 35 37 684 A1 | 4/1987 | |
| DE | 39 01 610 C1 | 2/1990 | |
| DE | 42 14 377 A1 | 11/1993 | |
| DE | 43 41 999 A1 | 6/1995 | |
| EP | 0 115 725 A1 | 8/1984 | |
| EP | 1 361 465 A1 | 11/2003 | |
| JP | 58-105114 | 6/1983 | |
| JP | 60-169813 | 9/1985 | |
| JP | 60-169815 | 9/1985 | |
| JP | 61-27510 | 2/1986 | |
| JP | 61-190305 | 8/1986 | |
| JP | 61-220536 | 9/1986 | |
| JP | 62-54204 | 3/1987 | |
| JP | 62-59906 | 3/1987 | |
| JP | 63-136007 | 6/1988 | |
| JP | 63-180915 | 7/1988 | |
| JP | 63-287916 | 11/1988 | |
| JP | 63-310317 | 12/1988 | |
| JP | 1-138828 | 5/1989 | |
| JP | 8-43639 | 2/1996 | |
| JP | 2001-116968 | 4/2001 | |
| WO | WO 2005/119322 A1 | 12/2005 | |
| WO | WO 2005/119324 A1 | 12/2005 | |
| WO | WO 2006/044080 A1 | 4/2006 | |
| WO | WO 2006/113726 A1 | 10/2006 | |
| WO | WO 2008/021253 A2 | 2/2008 | |

OTHER PUBLICATIONS

"DAM/BLOK™ Electrical Splice Kit," http://www.pmiind.com/products/damblok.html, 3 pages (Copyright 2000).

"Factory Installed Termination Systems for Fiber Optic Cable Splices," 1 page (admitted as prior art as of Jun. 21, 2006).

"Installation Instructions for Pre-Connectorized MIC® Cable (2-6 Fiber) Equipped with Plug & Play™ Systems Pulling Grips," *Corning Cable Systems*, Issue 7, pp. 1-3 (Jul. 2001).

"Pre-Connectorized (4-24 Fiber) Fiber Optic Cables Equipped with Plug & Play™ Systems Pulling Sleeves and Grips," *Corning Cable Systems*, Issue 1, pp. 1-7 (Mar. 2005).

International Search Report and Written Opinion mailed Nov. 28, 2008.

* cited by examiner

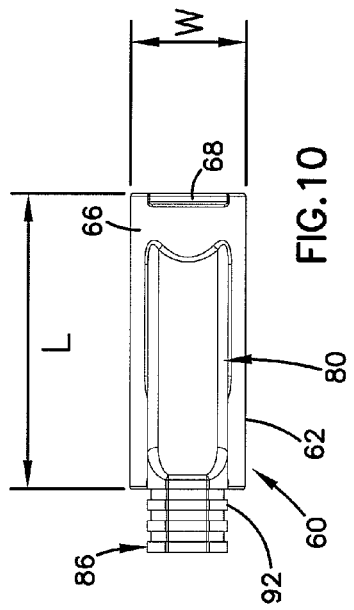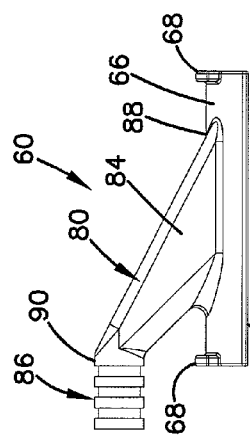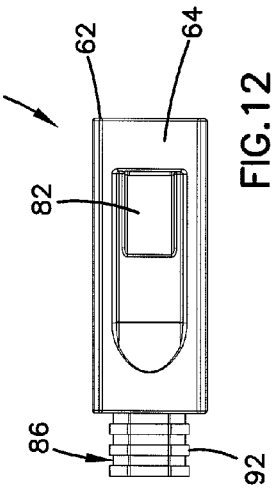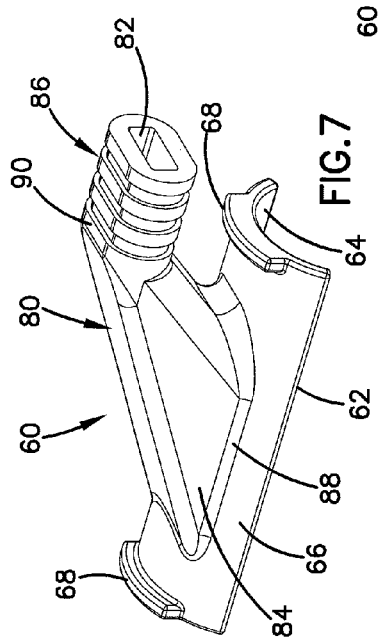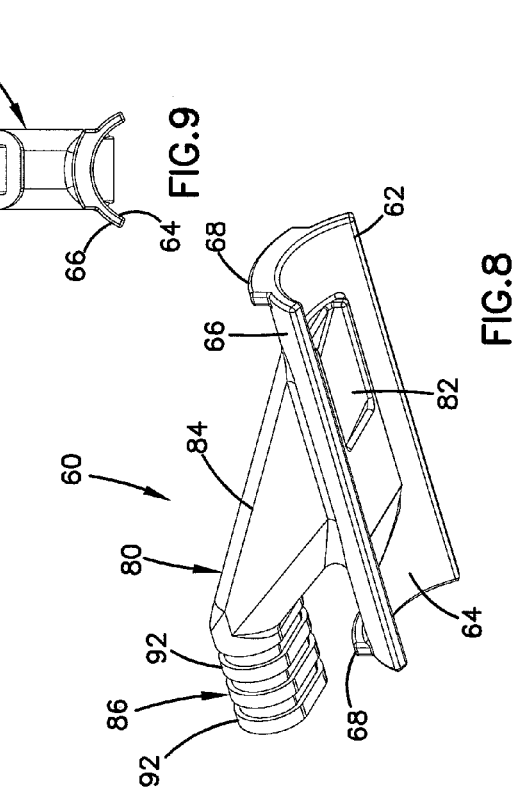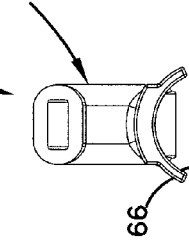

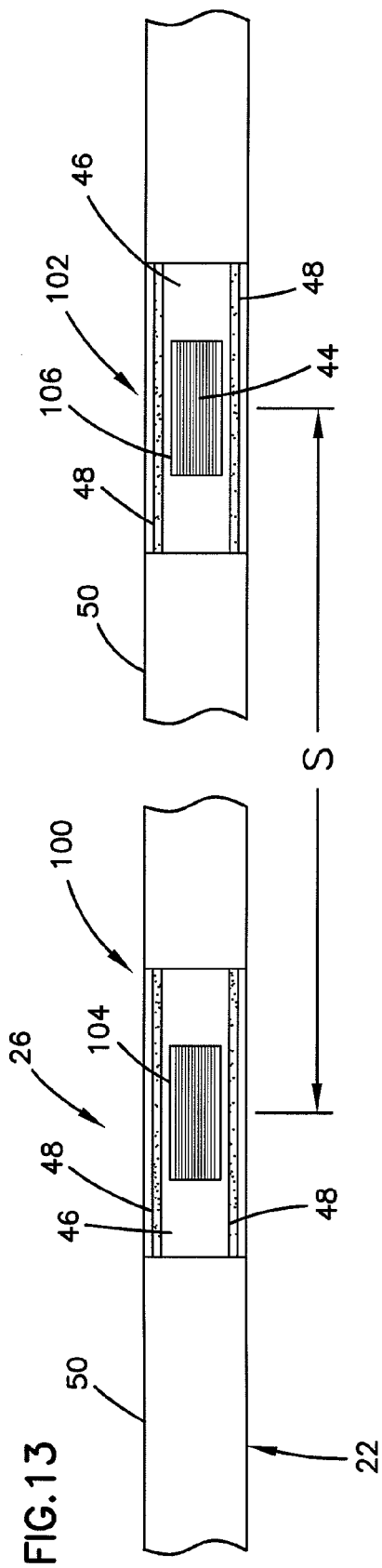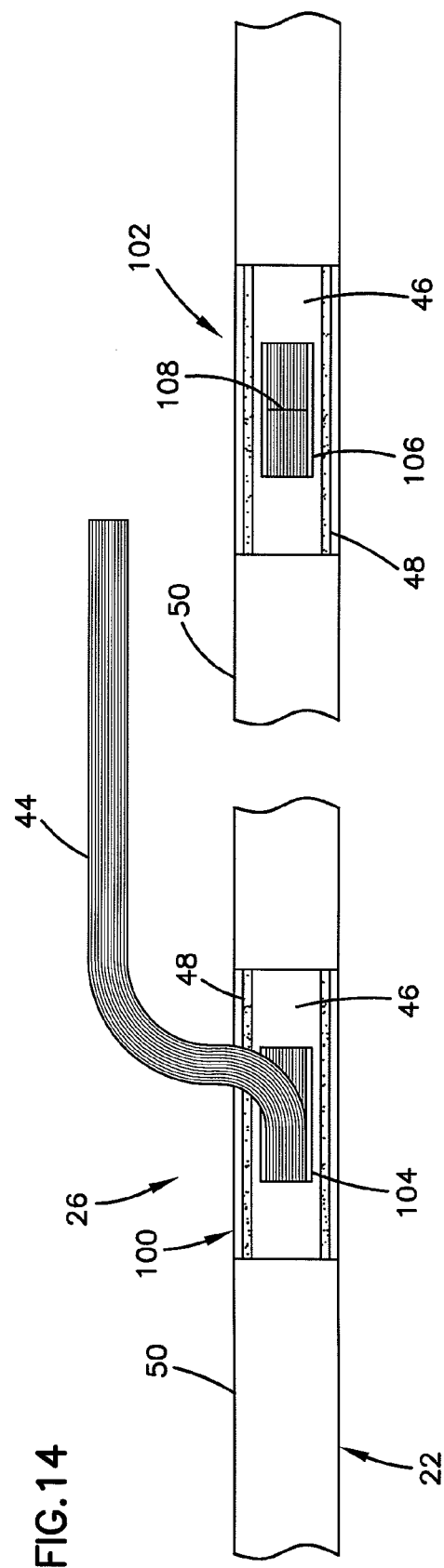

FIBER OPTIC DISTRIBUTION CABLE

TECHNICAL FIELD

The principles disclosed herein relate to fiber optic cable systems. More particularly, the present disclosure relates to fiber optic cable systems having main cables and branch cables.

BACKGROUND

Passive optical networks are becoming prevalent in part because service providers want to deliver high bandwidth communication capabilities to customers. Passive optical networks are a desirable choice for delivering high speed communication data because they may not employ active electronic devices, such as amplifiers and repeaters, between a central office and a subscriber termination. The absence of active electronic devices may decrease network complexity and/or cost and may increase network reliability.

To promote and support the expansion of optical networks, there is a need for reliable and cost competitive fiber optic distribution cable that can readily be installed in an efficient manner.

SUMMARY

Certain aspects of the disclosure relate to fiber optic cable systems, branch out configurations and methods that facilitate the manufacture, installation and use of fiber optic cable having factory installed branch cables.

A variety of additional aspects will be set forth in the description that follows. The aspects can relate to individual features and to combinations of features. It is to be understood that both the forgoing general description and the following detailed description are exemplary and explanatory only and are not restrictive of the broad concepts upon which the embodiments disclosed herein are based.

BRIEF DESCRIPTION OF THE DRAWINGS

FIGS. 7-12 show various views of a branch anchor adapted for use at the branch locations of the fiber optic distribution cable of FIG. 1

FIG. 13 illustrates the main cable of the fiber optic distribution cable of FIG. 1 during a manufacturing process in which the main cable is being prepared to allow access for a fiber ribbon within the main cable;

FIG. 14 shows the main cable of FIG. 13 after the fiber ribbon has been accessed;

DETAILED DESCRIPTION

Figure 1:
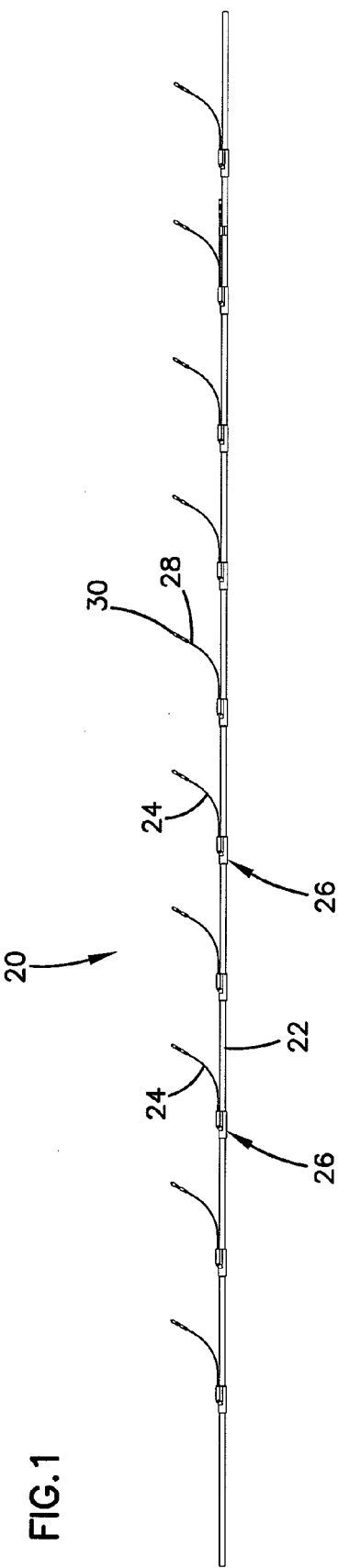
FIG. 1 illustrates a fiber optic distribution cable that is an embodiment of the present disclosure, the fiber optic distribution cable includes a main cable and tethers that branch from the cable at branch locations.

FIG. 1 shows a fiber optic distribution cable 20 in accordance with the principles of the present disclosure. The fiber optic distribution cable 20 includes a main cable 22 and a plurality of branch cables 24 that divert from the main cable 22 at branch locations 26. In the depicted embodiment, the branch cables 24 include tethers having free ends 28 that are connectorized with multifiber connectors 30.

In one embodiment, the fiber optic distribution cable 20 is adapted for indoor use for applications such as multi-dwelling units, businesses, or other indoor applications where multiple access points are desired along the length of a fiber optic cable. It is preferred for the branch cables 24 to be factory installed onto the main cable 22. By "factory installed", it is meant that the branch cables 24 are installed to the main cable 22 at the factory rather than in the field. After the branch cables 24 have been factory installed onto the main cable 22, the fiber optic distribution cable 20 is typically mounted on a spool to facilitate transporting the fiber optic distribution cable 20 to the field. To accommodate spooling, it is preferred for the branch locations 26 to have a flexible configuration that allows the branch locations 26 to be flexed or bent around the exterior of a spool. During transport of the fiber optic distribution cable 20 on the spool, the branch cables 24 can be strapped or otherwise secured to the main cable 22 (e.g., see FIG. 2 where the branch cable is shown in phantom line secured to the main cable 20 by a strap 25) to facilitate cable management.

Figure 2:
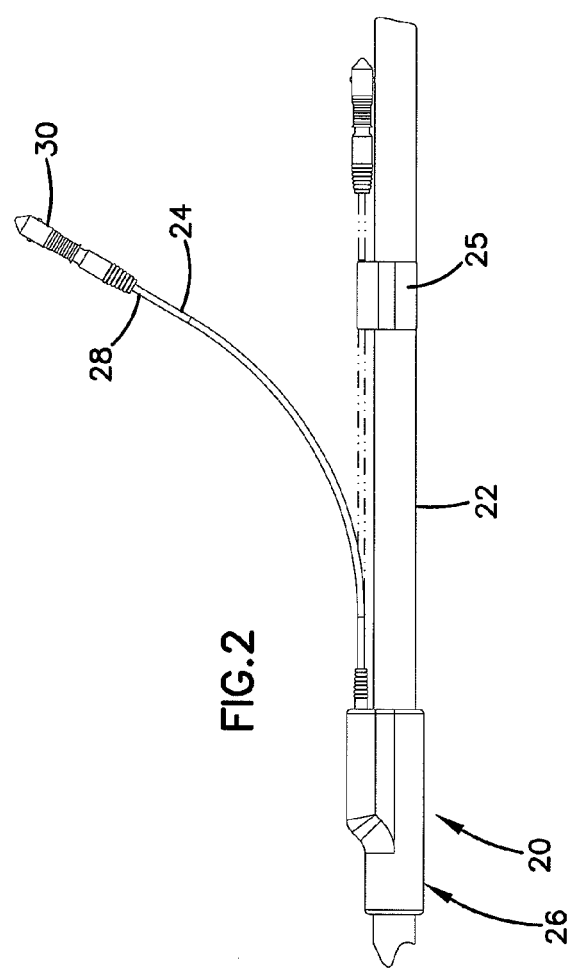
FIG. 2 shows a branch location of the fiber optic cable of FIG. 1, with the tether shown in phantom line secured to the main cable for transport, and in solid line separated from the main cable for use after transport.

During field installation of the fiber optic distribution cable 20 at a location such as a multi-dwelling unit, it is often necessary to route the fiber optic distribution cable 20 through pipes (e.g., PVC pipes). Often, such pipes have inner diameters that equal about 1.25 inches. Therefore, it is preferred for the branch locations 26 of the fiber optic distribution cable 20 to have a maximum cross dimension that is less than 1.25 inches so that the fiber optic distribution cable 20 can be readily routed through such pipes. The strapping of the branch cables 20 to the main cable 22 as shown in FIG. 2 also facilitates routing the fiber optic distribution cable 20 through the pipes.

It will be appreciated that the fiber optic distribution cable 20 can be manufactured with fixed spacings between the branch locations 26 (e.g., every 10 feet, every 20 feet, every 30 feet, etc.), or can be customized. A customized fiber optic distribution cable can have branch locations 26 provided at specific locations along the length of the fiber optic distribution cable 20 with the specific locations being specified by the end user to match their desired application. Customized cables often will have non-uniform spacings between the branch locations 26.

Figure 3:
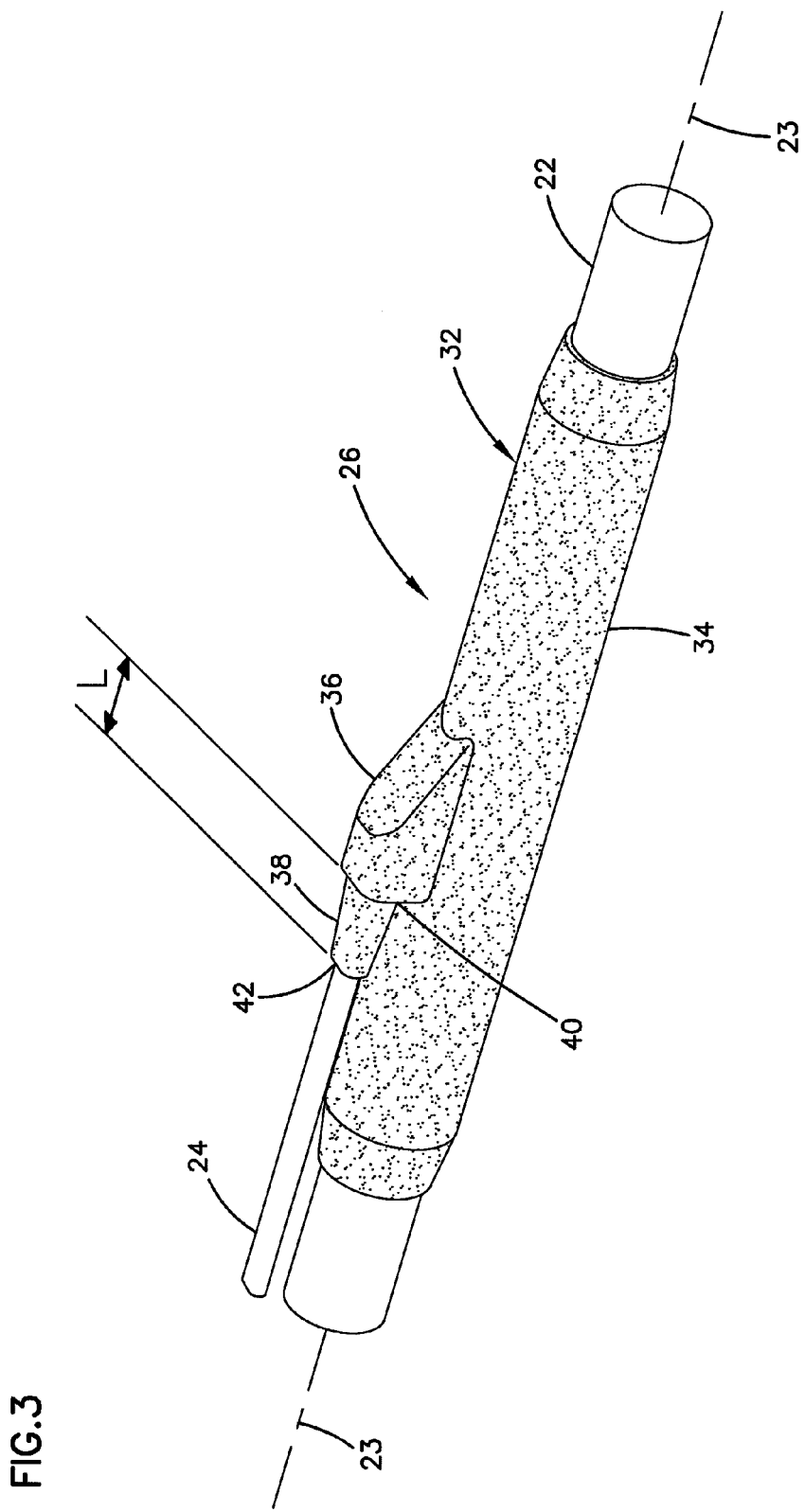
FIG. 3 is a first perspective view of one of the branch locations of the fiber optic cable of FIG. 1.
Figure 4:
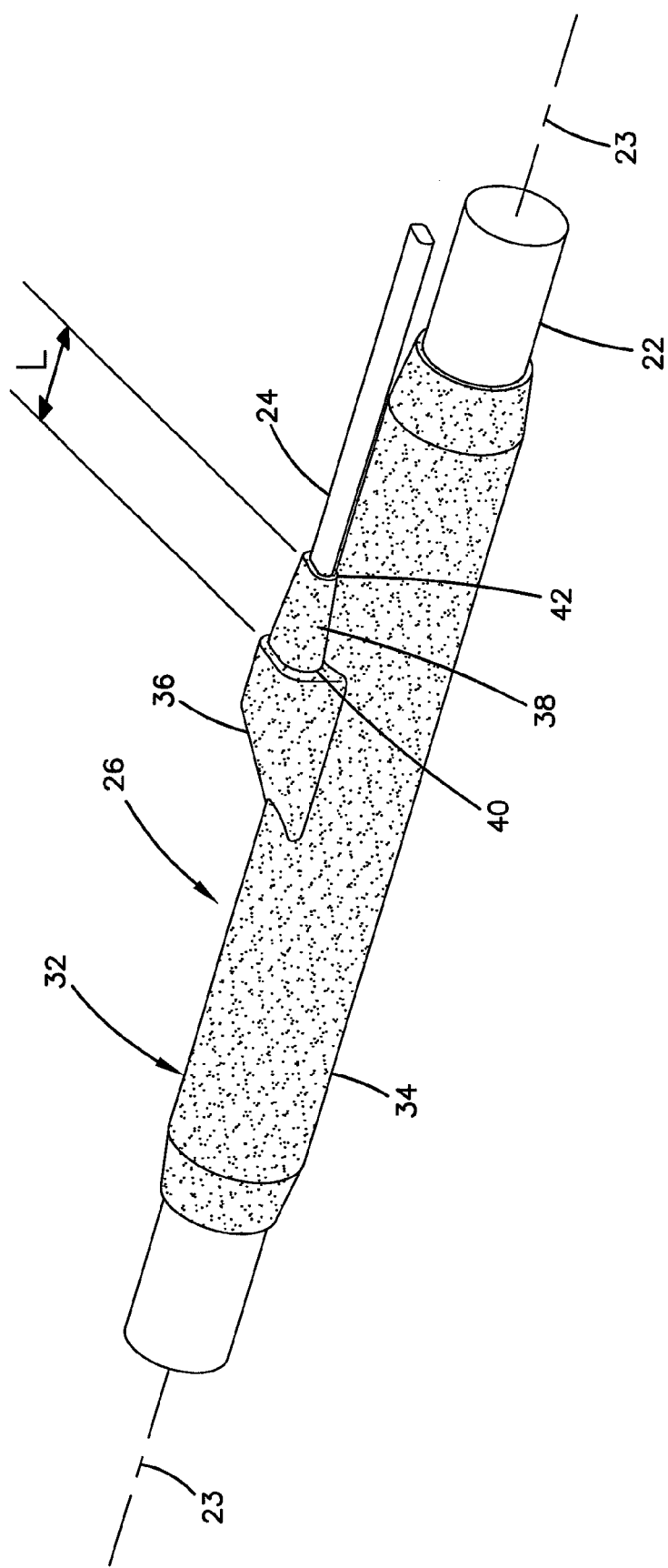
FIG. 4 is second perspective view of the branch location of FIG. 3.

FIGS. 3 and 4 are perspective views of one of the branch locations 26 of the fiber optic distribution cable 20 of FIG. 1. As shown at FIGS. 3 and 4, the branch location 26 includes a protective enclosure 32 that seals the branch location 26 with regard to moisture or other contaminants. In one embodiment, the protective enclosure 32 is formed of a flexible material (e.g., polyurethane or other material) that is overmolded about the branch location 26. In the depicted embodiment, the protective enclosure 32 includes a main portion 34 that covers the main cable 22, a radial extension portion 36 that covers a radial extension (e.g., such as a branch anchor) that projects radially outwardly from the main cable 22, and a boot portion 38. The boot portion 38 projects outwardly from the radial extension portion 36 and has a length L that extends generally parallel to a central axis 23 of the main cable 22. The boot portion 38 is adapted to cover an end of the branch cable 24 that is anchored at the branch location 26. The boot portion 38 supports and reduces strain on the branch cable 24 when the branch cable 24 is flexed or bent adjacent the anchored end. In the depicted embodiment, the boot portion 38 has a first end 40 that is integrally formed with the radial extension portion 36 of the protective enclosure 32, and a second end 42 that is separated from the first end 40 by the length L. The boot portion 38 has a cross-sectional shape that tapers from a larger configuration at the first end 40 to a smaller configuration at the second end 42.

Figure 5:
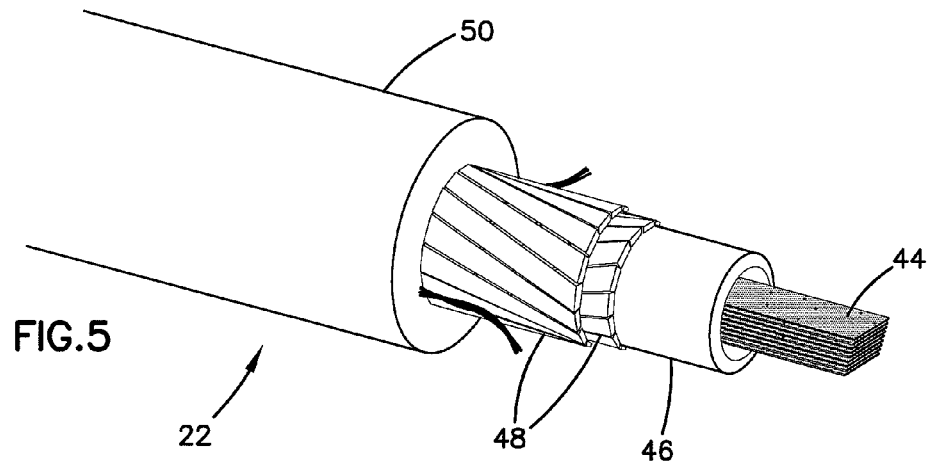
FIG. 5 is an exploded, perspective view of an example configuration suitable for the main cable of the fiber optic distribution cable of FIG. 1.

FIG. 5 shows an example construction for the main cable 22. In one embodiment, the main cable 22 can be a cable sold under the name Light Pipe™ Ribbon Indoor RoHS Riser Cable by Sumitomo Electric Company. As shown in FIG. 5, the main cable 22 includes a stack of optical fiber ribbons 44. In one embodiment, the cable 22 includes a stack of twelve optical fiber ribbons 44 each having twelve fibers. However, it will be appreciated that other numbers of fibers could also be used. Referring still to FIG. 5, the optical fiber ribbons 44 are contained within a central buffer tube 46 manufactured of a material such as polyvinylchloride or other materials. The central buffer tube 46 is surrounded by a strength layer 48 including strength elements such as aramid yard (e.g., Kevlar), fiber glass reinforced strength members, or other elements suitable for providing tensile reinforcement to the main cable 22. The strength layer 48 is covered by an outer jacket 50 made of a material such as polyvinylchloride or other materials. In one example embodiment, the main cable 22 can have a nominal outer diameter less than or equal to about 16.2 mm. Of course, cables having other dimensions could also be used.

Figure 6:
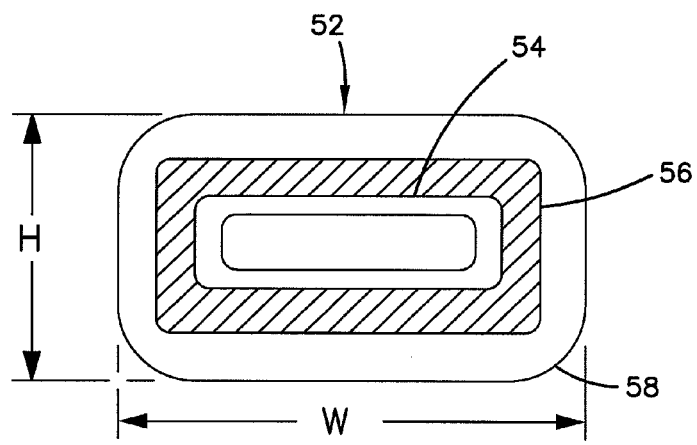
FIG. 6 is a cross-sectional view showing an example configuration of a furcation tube suitable for use in making the tethers of the fiber optic distribution cable of FIG. 1.

FIG. 6 shows an example furcation tube 52 having a configuration suitable for use in manufacturing the branch cables 24. As shown in FIG. 6, the furcation tube 52 has a generally rectangular cross-sectional shape that includes a buffer tube 54 constructed of a material such as a fluoropolymer or other materials. The buffer tube 54 is surrounded by a strength layer 56 formed by a material such as a layer of aramid yarn or other materials suitable for providing the cable with tensile reinforcement. The strength layer 56 is surrounded by an outer jacket 58 constructed of a material such as polyvinylchloride or other materials. In one embodiment, the furcation tube 52 has a cross-sectional height H that is generally equal to or less than about 2.5 mm, and a cross-sectional width W that is generally equal to or less than about 5 mm. Of course, cables having other dimensions could also be used.

FIGS. 7-12 show a branch anchor 60 that is preferably mounted at each of the branch locations 26. The branch anchor 60 provides a number of functions. For example, the branch anchor 60 guides or directs optical fibers (e.g., an optical fiber ribbon) from the main cable 22 to the corresponding branch cable 24. The branch anchor 60 also protects the accessed fiber (e.g., prevents the optical accessed fiber from being damaged or crushed), and defines an enclosed passage that prevents overmold material used to form the protective enclosure 32 from reaching the accessed optical fiber or the interior of the central buffer tube 46 of the main cable 22. Additionally, the branch anchor 60 functions as an anchor for mechanically securing the branch cable 24 to the main cable 22. For example, the branch anchor 60 can include a location for mechanically securing the branch cable 24 (e.g., by a crimp or other technique). Additionally, the branch anchor 60 can be imbedded or overcoated within the protective enclosure 32 such that the material of the enclosure mechanically bonds or otherwise secures the branch anchor 60 to the main cable 22.

The branch anchor 60 includes a base 62 having a length L and a width W. The base 62 has a first surface 64 having a concave curvature that extends across the width W. In a preferred embodiment, the concave curvature generally matches the shape of the outer diameter of the buffer tube 46 of the main cable 22. The length L of the base is preferably sized sufficiently large to allow the base 62 to cover an access window 104 (see FIG. 13) that is cut into the buffer tube 46 to allow one of the optical fiber ribbons 44 of the main cable 22 to be accessed. The base 62 also includes a second surface 66 that faces in an opposite direction from the first surface 64. The second surface 66 has a convex curvature as the second surface extends across the width W of the base 62. Rails 68 project outwardly from the second surface 66 adjacent the ends of the base 62.

Referring still to FIGS. 7-12, the branch anchor 60 also includes an arm 80 that projects outwardly from the second surface 66 of the base 62. The arm 80 preferably defines an inner channel 82 configured for receiving and guiding one of the optical fiber ribbons 44 from the main cable 22 to a branch cable 24. The arm 80 includes an angled portion 84 and a crimp retaining portion 86. The angled portion 84 includes a first end 88 integrally formed with the base 62 and a second end 90 integrally formed with the crimp retention portion 86. The angled portion 84 has a tapered transverse cross-section that reduces in size as the angled portion 84 extends from the base 62 to the crimp retaining portion 86. The inner channel 82 defined within the angled portion 84 also reduces in size as the inner channel 82 extends along the length of the angled portion 84 from the first end 88 to the second end 90. When the branch anchor 60 is mounted on the main cable 20 as shown at FIG. 17, the angled portion 84 preferably extends outwardly from the central axis 23 of the main cable 22 at an oblique angle θ relative to the central axis 23 of the main cable 22.

Figure 17:
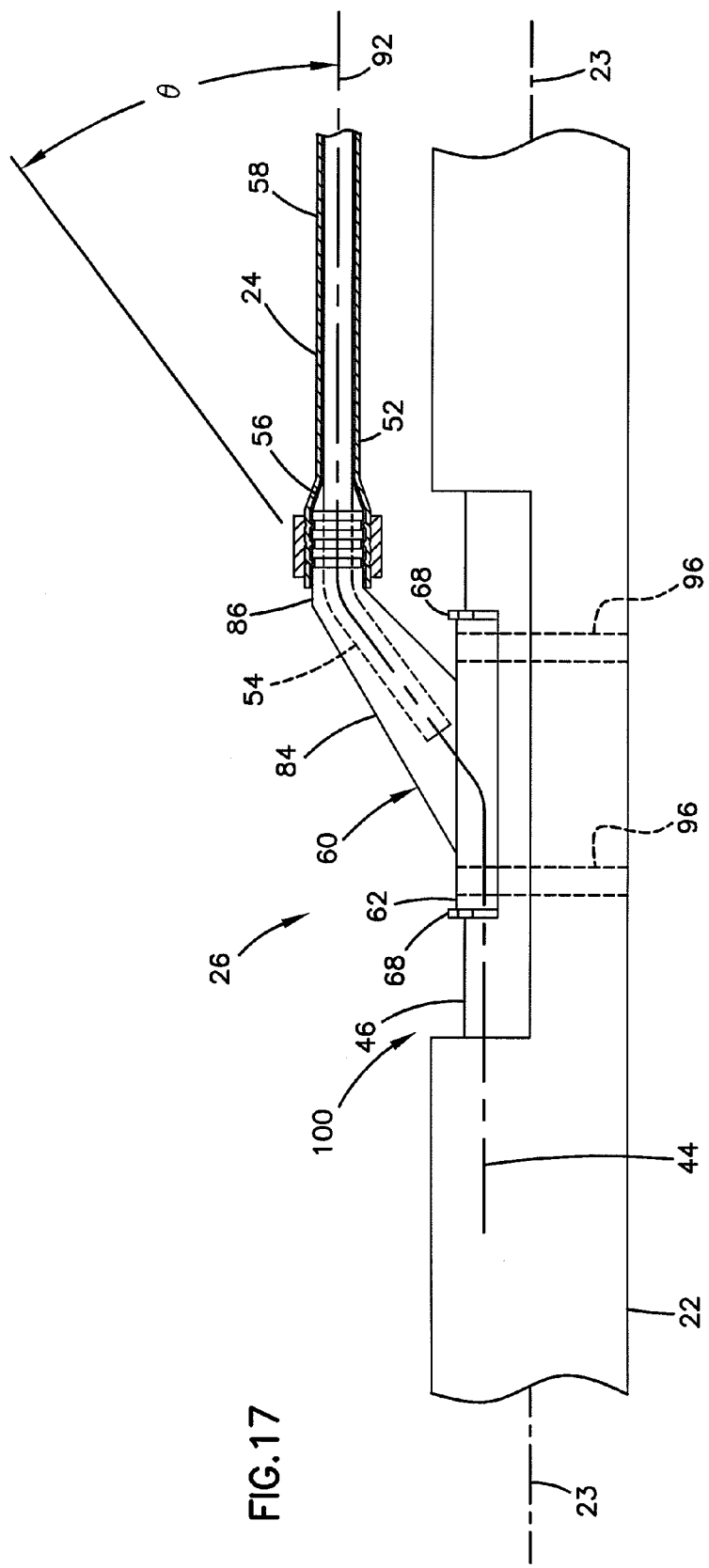
FIG. 17 shows the branch anchor and furcation tube assembly of FIG. 11 mounted at a branch location of the fiber optic distribution cable of FIG. 1 prior to the branch location being overmolded.

When the branch anchor 60 is mounted at a branch location 26, the crimp retaining portion 86 of the arm 80 is preferably aligned along an axis 92 that is generally parallel to the central axis 23 of the main cable 22 (see FIG. 17). The portion of the inner channel 82 extending through the crimp retaining portion 86 has a generally constant shape that generally matches the outer shape of the buffer tube 54 of the furcation tube 52. A plurality of retention ribs 92 are provided about the exterior of the crimp retaining portion 86.

In a preferred embodiment, the branch anchor 60 has a one-piece construction. For example, the branch anchor 60 can be molded as a single piece plastic part. Preferably, the branch anchor 60 is sufficiently rigid to adequately protect the fibers that are accessed at the branch location 26. The single piece design facilitates installing the branch anchor 60 at a given branch location, and also provides a mechanical strength at the crimp retaining portion 86.

To attach one of the branch cables 24 to the main cable 22 at one of the branch locations 26, portions of the outer jacket 50 are removed from the main cable 22 at first and second locations 100, 102 (see FIG. 13). In one embodiment, the first and second locations 100, 102 are separated by a distance S that generally equals a desired length of the branch cable 24 (e.g., a length of the tether) that is desired to be attached at the branch location 26. Once the portions of the outer jacket 50 have been removed at the first and second locations 100, 102, the strength layer 48 is pushed away to expose an outer surface of the central buffer tube 46. Once the outer surface of the central buffer tube 46 is exposed at the first and second locations 100, 102, access windows 104, 106 are cut into the central buffer tube 46 at the first and second locations 100, 102 to allow one or more of the optical fiber ribbons 44 to be accessed. One of the optical fiber ribbons 44 is then selected and cut at a cut line 108 located at the second location 102 (see FIG. 14). After the selected optical fiber ribbon 44 has been cut at the second location 102, the optical fiber ribbon 44 is accessed at the first location 104 and is pulled from the central buffer tube 146 through the access window 104 (see FIG. 14). Once the selected optical fiber ribbon 144 has been cut and pulled from the main cable 22, the furcation tube 52 can then be attached to the branch location 26.

Figure 15:
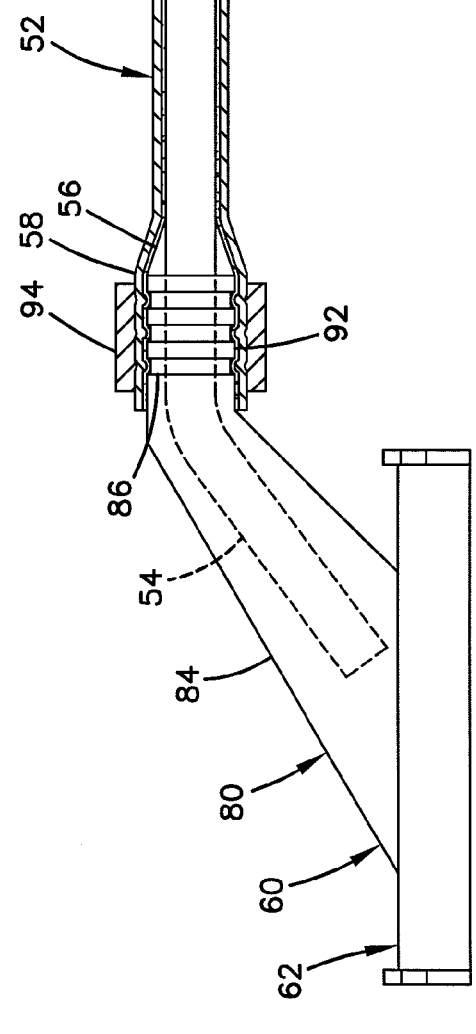
FIG. 15 shows a partially cut-away view of a branch anchor and furcation tube assembly that is preassembled before the branch anchor is mounted at a branch location of the fiber optic distribution cable of FIG. 1.
Figure 16:
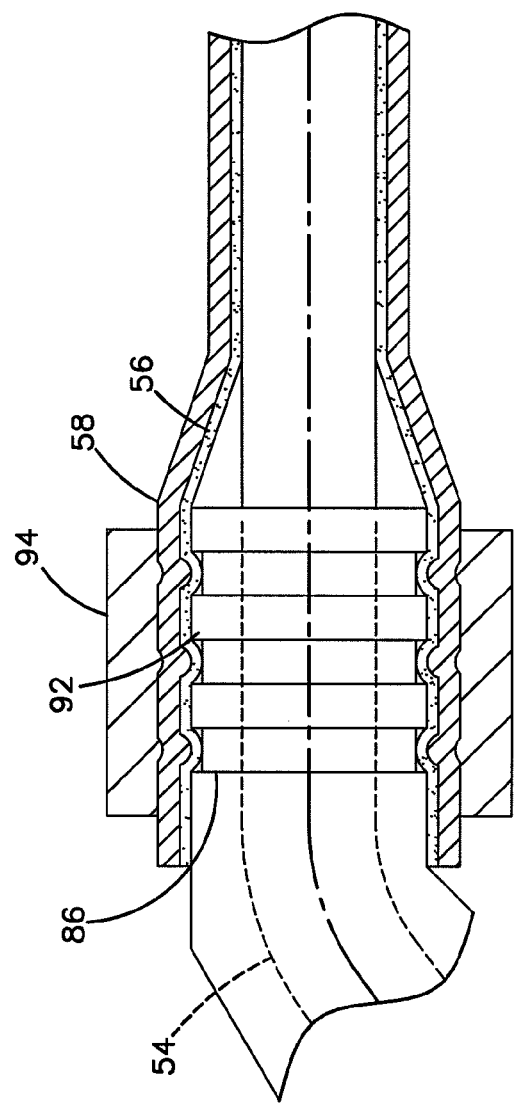
FIG. 16 is an enlarged, detailed view of a portion of FIG. 15.

Prior to attaching the furcation tube 52 to the branch location 26, the furcation tube 52 is preferably attached to the branch anchor 60. For example, referring to FIG. 15, the buffer tube 54 of the furcation tube 52 is inserted into the inner channel 82 of the branch anchor 60 such that the buffer tube 54 extends through the crimp retaining portion 86 and into the angled portion 84. Additionally, the strength layer 56 and the outer jacket 58 are positioned about the exterior of the crimp retaining portion 86. A mechanical fastener such as a crimp 94 is radially compressed about the exterior of the outer jacket 58 such that the outer jacket 58 and the strength layer 56 are compressed between the crimp 94 and the outer surface of the crimp retaining portion 86. The retention ribs 92 assist in providing a secure mechanical attachment point at the crimp location.

After the furcation tube 52 has been secured to the branch anchor 60, the accessed optical fiber ribbon 44 is fed through the base 62 of the branch anchor 60 and into the buffer tube 54 of the furcation tube 52. Preferably, the optical fiber ribbon 44 is fed all the way through the length of the buffer tube 54 until an end of the optical fiber ribbon 44 projects outwardly beyond a free end of the furcation tube 52 (i.e., beyond the free end 28 of the branch cable 24). Thereafter, one of the multi-fiber connectors 30 can be terminated to the end of the optical fiber ribbon 44 and mechanically secured to the free end of the furcation tube 52 to complete the assembly of the branch cable 24. Additionally, once the optical fiber ribbon 44 has been fed through the furcation tube 52, the base 62 of the branch anchor 60 can be mounted at the branch location 26 by placing the first surface 64 against the exposed outer surface of the buffer tube 46. Retaining members 96 (e.g., tape, strapping or other material) are preferably positioned over the second surface across the width W of the base 62 to temporarily secure the base 62 to the buffer tube 46. Rails 68 assist in preventing the attachment members 96 from disengaging from the base 62.

Once the branch anchor 60 has been temporarily secured to the branch location 26, the branch location 26 can be placed within a mold that defines the shape of the protective enclosure 32. Thereafter, an overmold material such as polyurethane is injected into the mold to form the protective enclosure 32. The protective enclosure provides a seal around opposite ends of the branch location 26. The enclosure also covers the access location 100 as well as the branch anchor 60 and portions of the branch cable 24. Once the branch anchor 60 is imbedded within the protective enclosure 32, the overmold material of the protective enclosure 32 functions to mechanically secure the branch anchor 60 to the main cable 22. Material can also be overmolded at the second access location 102 to enclose or seal the second access location 102. In certain embodiments, a heat resistant material such as tape can be wrapped over the first and second access locations 100, 102 prior to applying the overmold material.

The embodiment described above has a spliceless transition from the portion of the optical fiber ribbon 44 located within the central buffer tube 46 to the portion of the optical fiber ribbon 44 that is located within the buffer tube 54 of the furcation tube 52. In other embodiments, a splice may be used at the branch location 26 to provide an optical connection between an optical fiber ribbon 44 located within the main cable 22 and a separate optical ribbon provided within the buffer tube 54 of the furcation tube 52.

The above specification provides examples of how certain aspects may be put into practice. It will be appreciated that the aspects can be practiced in other ways than those specifically shown and described herein without departing from the spirit and scope of the present disclosure.

What is claimed is:

1. A fiber optic distribution cable comprising:
a main cable having a plurality of branch locations;
branch cables that divert from the main cable at the branch locations, each branch cable having strength elements surrounded by an outer jacket;
branch anchors through which optical fibers are routed, the branch anchors being positioned at the branch locations, the strength elements and outer jackets of the branch cables being secured to the branch anchors; and
overmolded protective enclosures that cover the branch locations, the protective enclosures including first portions that cover the main cable, second portions that project radially outwardly from the first portions to cover the branch anchors, and third portions that extend from the second portions to form boots that cover portions of the branch cables, the third portions extending at least partially along the first portions.

2. The fiber optic distribution cable of claim 1, wherein the strength elements and outer jackets of the branch cables are secured to exterior surfaces of the branch anchors.

3. The fiber optic distribution cable of claim 2, wherein the strength elements and outer jackets of the branch cables are crimped to crimp retaining portions of exterior surfaces of the branch anchors.

4. The fiber optic distribution cable of claim 3, wherein the branch anchors each include a plurality of retention ribs about the crimp retaining portion.

5. The fiber optic distribution cable of claim 1, wherein the branch cables each include a buffer tube, wherein the strength elements of each branch cable are positioned between the jacket and the buffer tube, and wherein the buffer tubes include end portions that extend into the branch anchors.

6. The fiber optic distribution cable of claim 1, wherein each of the third portions has a cross-sectional shape that tapers from a larger configuration at a first end that is integral with the respective second portion to a smaller configuration at a second end spaced from the first end.

7. The fiber optic distribution cable of claim 1, wherein each branch anchor includes a base having a first surface having a concave curvature, the first surface extending over the main cable.

8. The fiber optic distribution cable of claim 7, wherein the base of each branch anchor also has a second surface having a convex curvature.

9. The fiber optic distribution cable of claim 8, wherein rails project outwardly from the second surface of the base of each branch anchor.

10. The fiber optic distribution cable of claim 1, wherein the first portion of each enclosure is generally cylindrical.

11. The fiber optic distribution cable of claim 1, wherein the third portion of each enclosure extends generally parallel to the first portion of the enclosure.

* * * * *